United States Patent [19]
Sato et al.

[11] Patent Number: 5,761,544
[45] Date of Patent: Jun. 2, 1998

[54] CAMERA SHAKE DETECTING DEVICE

[75] Inventors: Tatsuya Sato, Hachioji; Tsuyoshi Yaji, Kawagoe, both of Japan

[73] Assignee: Olympus Optical Co., Inc., Tokyo, Japan

[21] Appl. No.: 778,900

[22] Filed: Jan. 3, 1997

[30] Foreign Application Priority Data

Jan. 10, 1996 [JP] Japan ............... 8-002426

[51] Int. Cl.⁶ ............................................... G03B 17/00
[52] U.S. Cl. ...................................................... 396/53
[58] Field of Search ........................... 396/50, 51, 52, 396/53, 54, 55

[56] References Cited

U.S. PATENT DOCUMENTS

| | | | |
|---|---|---|---|
| 5,122,827 | 6/1992 | Saegusa et al. | 396/50 |
| 5,416,557 | 5/1995 | Nagasaki et al. | 396/52 |
| 5,499,068 | 3/1996 | Satoh et al. | 396/55 |
| 5,546,159 | 8/1996 | Imura et al. | 396/52 |
| 5,559,574 | 9/1996 | Kai et al. | 396/55 |
| 5,561,485 | 10/1996 | Hamada et al. | 396/55 |

FOREIGN PATENT DOCUMENTS 5-61091  3/1993  Japan.

*Primary Examiner*—Russell E. Adams
*Attorney, Agent, or Firm*—Michaelson & Wallace; Peter L. Michaelson; John C. Pokotylo

[57] ABSTRACT

A single lens reflex camera includes a pair of vibration-type gyros as camera shake detecting sensors which are arranged on a pair of roof planes of a pentagonal prism forming a finder optical system. The detecting directions of the vibration-type gyros are different from the directions of the short side and the long side of a film plane, so that the vibration-type gyros can be arranged at a high degree of freedom and the size of the camera can be reduced.

7 Claims, 5 Drawing Sheets

CAMERA SHAKE DETECTING DEVICE

BACKGROUND OF THE INVENTION

1. Field of the Invention

The present invention relates to a camera shake detecting device, and more particularly, to a technique for arranging in a camera means for detecting camera shake caused by a user.

2. Description of the Related Art

In the above-mentioned field of cameras in recent years, techniques have been developed to reduce or eliminate a bad influence caused by camera shake which may occur while photographing. For example, the amount of the camera shake caused by the user is detected, and the timing of shutter release is adjusted to a time period when the camera shake becomes smaller, or a part of the optical system of a photographing lens is driven to compensate and cancel the camera shake. In order to detect the amount of the camera shake, a method is known for detecting, by an angular velocity sensor, an angular velocity caused by the camera shake. In this case, an angular velocity detecting element of a piezoelectric vibration type (hereafter "vibration-type gyro") is employed as the angular velocity sensor. Normally, two gyros, functioning as the angular velocity sensors, are arranged to detect shakes of an image in two perpendicular directions on a film plane. Japanese laid-open patent publication No. Hei 5-61091 discloses that a plurality of vibration-type gyros are arranged in a space surrounded and formed by a lens barrel, a front body and a spool room wall, that is, in the vicinity of the central portion of the camera.

Furthermore, on the market are cameras in which vibration-type gyros used as angular velocity sensors are arranged within an interchangeable lens having a vibration compensating function. Normally, the amount of a camera shake is detected, and a part of the photographing optical system or the imaging device itself is driven in accordance with the detected amount of the camera shake to cancel the camera shake, so that the influence of image movement caused by the camera shake can be compensated. In such an example, the directions of axes about which the camera shakes are detected are coincident with the directions of rotational driving axes for compensating the camera shake.

FIGS. 6(a) to 6(d) illustrate an example of conventional arrangement of vibration-type gyros in the camera body. A pair of vibration-type gyros 202 and 203 are arranged in a camera body 200 to detect camera shakes in two directions. The vibration-type gyro 202 is arranged in the lower part of the camera body so that the longitudinal direction of the vibration-type gyro 202 is parallel to the long side of a film plane 201. The other vibration-type gyro 203 is arranged in the camera body so that the longitudinal direction of the vibration-type gyro 203 is parallel to the short side of the film plane 201. Thus, the amount of the shake of a plane corresponding to the film plane 201 can be detected. The vibration-type gyros 202 and 203 are supported in the camera by supporting members 204 and 205, respectively. The vibration-type gyro 202 detects the angular velocity of a shake of θy in the direction of the arrow shown in FIG. 6(b), and the other vibration-type gyro 203 detects the angular velocity of a shake of θx in the direction of the arrow shown in FIG. 6(c). That is, the amount of the camera shake is obtained by detecting the angular velocity in the rotational direction about the x-axis or the y-axis in the film plane 201 shown in FIG. 6(d).

In the conventional art, the two vibration-type gyros are arranged so that the directions of their detection axes, about which the camera shakes are detected, are coincident with the directions of rotational driving axes for compensating the camera shakes.

However, such methods of arranging the shake detecting sensors, such as the vibration-type gyros, in the conventional art have the following drawbacks. If the shake detecting sensors are arranged in the camera, an additional space is required for arranging the camera-shake detecting sensors near the central part of the camera body, so that the body itself will probably need to be larger. Likewise, if the shake detecting sensors are arranged in the interchangeable lens, the outside diameter of the lens barrel also becomes larger by the external form of the shake detecting sensors. Consequently, the camera and the interchangeable lens become larger with a useless space, which is a large obstacle to minimizing the size and weight lightening of the camera.

SUMMARY OF THE INVENTION

An object of the present invention is to provide a camera shake detecting device which can be arranged at a high degree of freedom with respect to the configuration of the camera and does not entail the camera itself becoming larger.

A camera shake detecting device according to the present invention comprises a first shake detector for detecting an amount of a camera shake in a first direction which is not parallel to the long side and the short side of a film plane, and a second shake detector for detecting an amount of a camera shake in a second direction which is perpendicular to the first direction.

In another aspect of the present invention, a camera shake detecting device comprises a first shake detector arranged in the vicinity of a finder for detecting an amount of a camera shake in a first direction, and a second shake detector arranged in the vicinity of the finder for detecting an amount of a camera shake in a second direction intersecting the first direction at a predetermined angle.

BRIEF DESCRIPTION OF THE DRAWINGS

FIG. 1(a) is a front elevational view of a camera schematically illustrating the positional relationship of two vibration-type gyros for detecting a camera shake; FIG. 1(b) is an illustration of detection axes of the vibration-type gyros at a film plane; and FIG. 1(c) is an illustration of an angular velocity around the detection axis of the vibration-type gyro.

FIG. 2(a) is an elevational view schematically illustrating the positional relationship of the two vibration-type gyros for detecting the camera shake; and FIG. 2(b) is a plan view schematically illustrating the positional relationship of the vibration-type gyros.

FIG. 3(a) is a sectional view of a pentagonal prism and the vibration-type gyros; and FIG. 3(b) is a perspective view of the pentagonal prism viewed obliquely from the upper side.

FIG. 6(a) is a front view of the camera illustrating the positional relationship of vibration-type gyros; FIG. 6(b) is a side view of the camera illustrating a shake in the y-axis direction with respect to a film plane; FIG. 6(c) is a plan view of the camera illustrating a shake in the x-axis direction; and FIG. 6(d) is an illustration of the directions of the two axes in the film plane.

DETAILED DESCRIPTION OF THE PREFERRED EMBODIMENTS

Figure 1A:
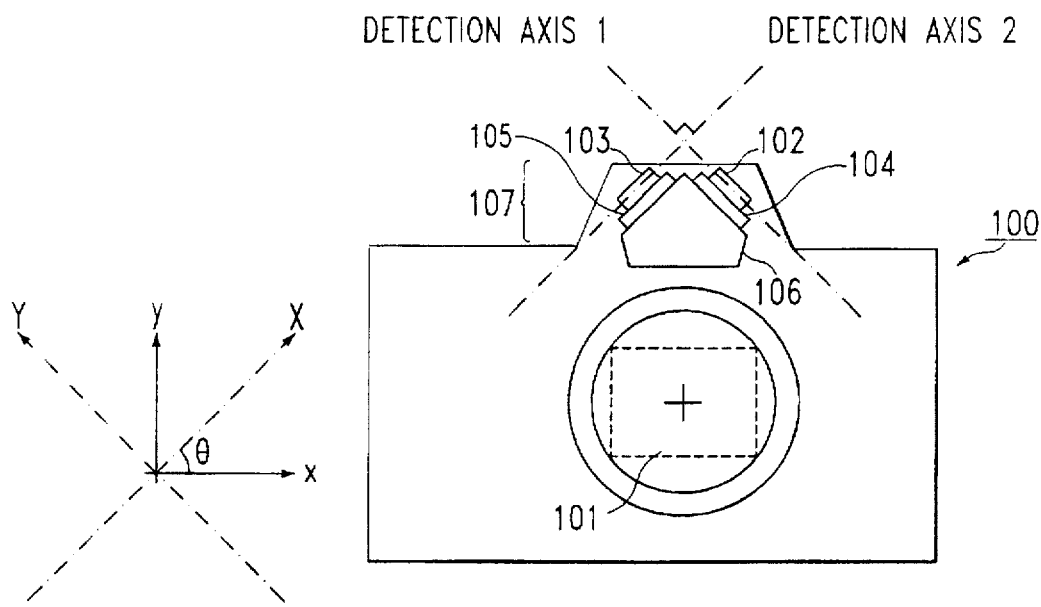
FIGS. 1(a), 1(b) and 1(c) show a first embodiment of a camera shake detecting device according to the present invention.

Reference will be made in detail to the presently preferred embodiments of the invention as illustrated in the accompanying drawings, in which like reference characters designate like or corresponding parts throughout the several drawings.

FIG. 1(a) schematically shows the arrangement of two vibration-type gyros 102 and 103 for detecting a camera shake, in a camera shake detecting device of a first embodiment of the present invention. Although, the illustrated embodiment only includes two gyros, the number of the gyros may be three or more.

The optical axis of a photographing lens (not shown), detachably mounted to a camera body 100,is coincident with the center of a film plane 101. An object to be photographed is imaged on the film by a known exposure operation.

Light from the object to be photographed passes through the photographing lens,is reflected by a movable mirror (not shown) arranged in front of the film plane 101, is reflected several times in a pentagonal prism 106 composing a finder optical system, and is led to an eyepiece of the finder (not shown). Such a single lens reflex camera has a configuration 107 protruding in the vertical direction thereof since the pentagonal prism 106 is provided.

Figure 1B:
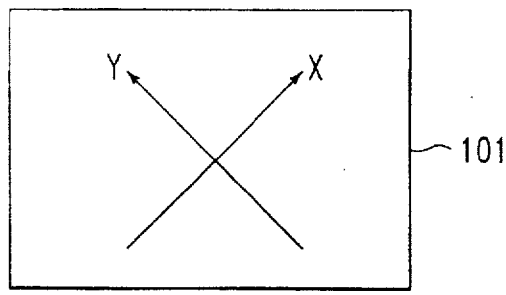
Figure 1C:
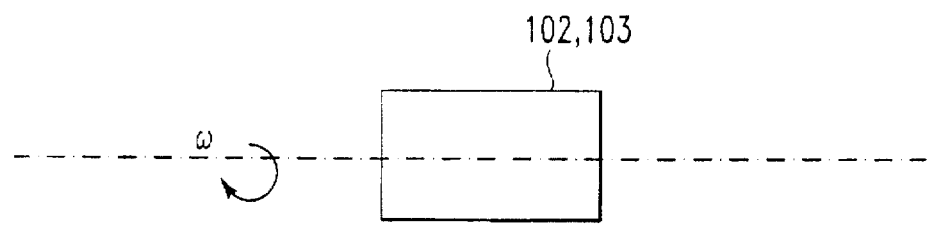

In the camera shake detecting device of this embodiment, the two vibration-type gyros 102 and 103, used as shake detectors for detecting angular velocities, are arranged to detect two angular velocities around their detection axes as shown in FIG. 1(c).

The vibration-type gyros 102 and 103 are mounted by supporting members 104 and 105 on two inclined planes, the so-called roof planes, of the pentagonal prism 106 such that that their detection axes are co-planar. The vibration-type gyros 102 and 103 are symmetrical with respect to a vertical line passing through the vertex of the pentagonal prism 106. The plane including the detection axes of the two vibration-type gyros 102 and 103 for detecting the angular velocities is perpendicular to the optical axis of the photographing lens (accordingly, parallel to the film plane). The two detection axes are arranged in symmetry with respect to the vertical direction of the camera.

The vibration-type gyros 102 and 103 have detection axes 1 and 2, respectively, in their longitudinal directions, and each of the gyros 102 and 103 outputs an electric signal 107 corresponding to an angular velocity ω in the rotational direction about each detection axis, as shown in FIG. 1(c). The detection axes 1 and 2 are arranged so as to be perpendicular to each other for detecting a vibration, occurring due to the camera shake, of the plane including these detection axes.

The supporting members 104 and 105 support these vibration-type gyros 102 and 103, respectively, such that the gyros 102 and 103 are offset by a predetermined angle θ with respect to the x-axis and y-axis, respectively, the x- and y-axes being parallel to the long side and the short side of the film, respectively. As stated above, the angle formed by the respective detection axes of these two vibration-type gyros 102 and 103 is set to be a right angle, and in this embodiment the offset angle θ is set to 45°. When the angle θ is set to 45°, it is easy to convert, via caculation, the amounts of rotations around the detection axis of gyros 102 and 103 to rotations around the x- and y-axes, if necessary.

The two vibration-type gyros 102 and 103 thus arranged can detect the amounts of camera shakes about the X- and Y-axes forming an angle of 45° with respect to the long side direction x and the short side direction y, respectively, in the film plane 101 of the camera, as shown in FIG. 1 (b).

The directions of shake detection of this camera are different from those of the conventional camera exemplified in FIGS. 6(a) to 6(d), but the same effect can be obtained in that the shake of the film plane is detected in two perpendicular directions.

Moreover, since the vibration-type gyros 102 and 103 are arranged on the pentagonal prism 106 and are located apart from the central part of the camera, the positional change of the vibration-type gyros caused by the camera shake is larger compared with the conventional arrangement of the gyros, so that the detection of the shake is easier.

Figure 2A:
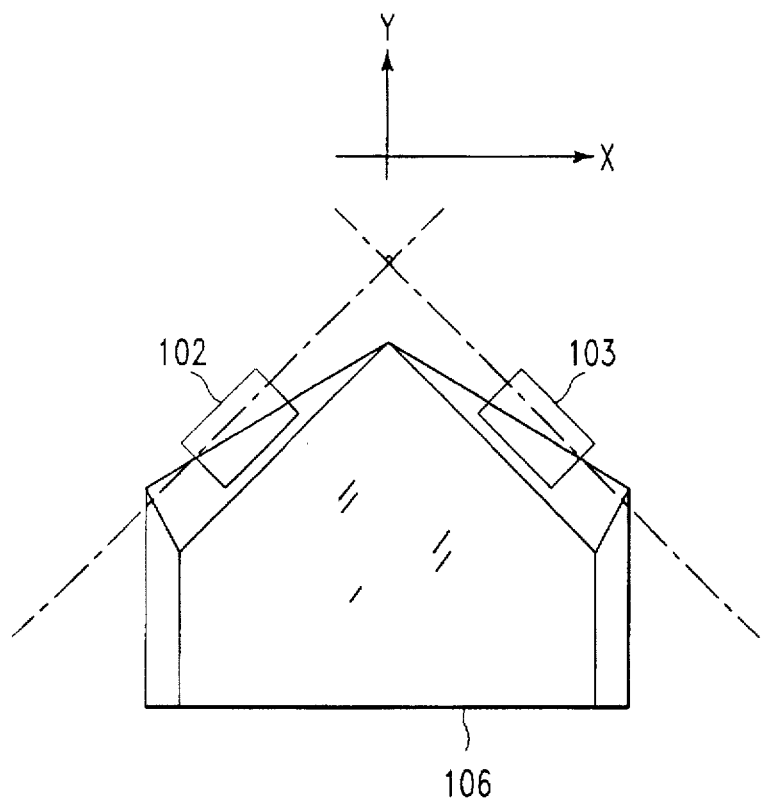
FIGS. 2(a) and 2(b) show the first embodiment of the present invention.
Figure 2B:
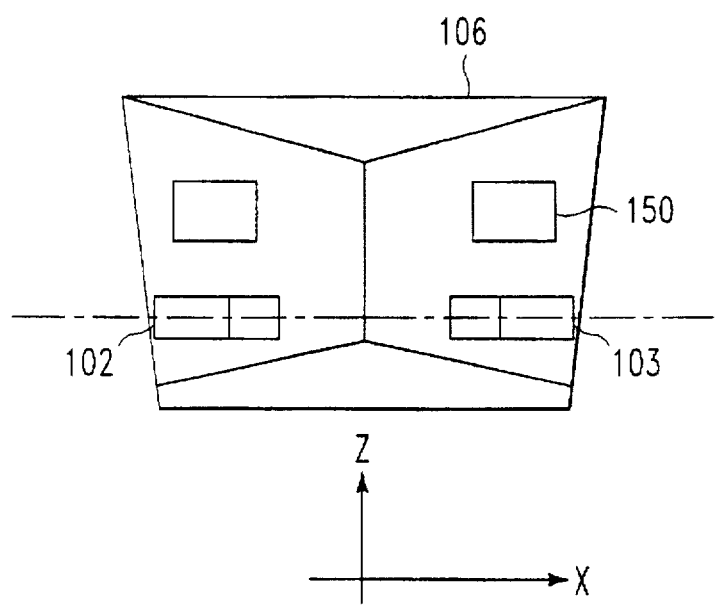

FIGS. 2(a) and 2(b) schematically show a mounted state of the vibration-type gyros 102 and 103. FIG. 2(a) is a view of the pentagonal prism 106 viewed from the eyepiece side, and FIG. 2(b) is a view of the pentagonal prism 106 viewed from above. As shown in FIG. 2(a), the gyros 102 and 103 are arranged on the pentagonal prism 106 such that viewed from the eyepiece side, the detection axes of these two vibration-type gyros 102 and 103 form an angle of 45° with respect to the x- and y-axes, respectively and intersect at a right angle. As shown in FIG. 2(b), the plane including the two detection axes is parallel to the x-axis.

Furthermore, as shown in FIG. 2(b), a shake signal processing integrated circuit (IC) 150 for processing outputs from these two vibration-type gyros 102 and 103 is arranged in the vicinity of the vibration-type gyro 103, and is electrically connected to a connecting means (not shown).

This shake signal processing IC 150 is arranged near these vibration-type gyros 102, 103 because normally, the output signal from the vibration-type gyro 102 or 103 is apt to be influenced by noise. For example, the output signal is largely affected by a fluctuation of the voltage of a power source. By providing the shake signal processing IC 150 on the surface of the prism 106 and nearest to the vibration-type gyros 102 and 103 as shown in the FIG. 2(b), instead of apart from the gyros, the IC 150 can considerably be separated from a motor, a battery, a flash boost circuit and the like of the camera, so that it will seldom be affected by disturbance noise.

Figure 3A:
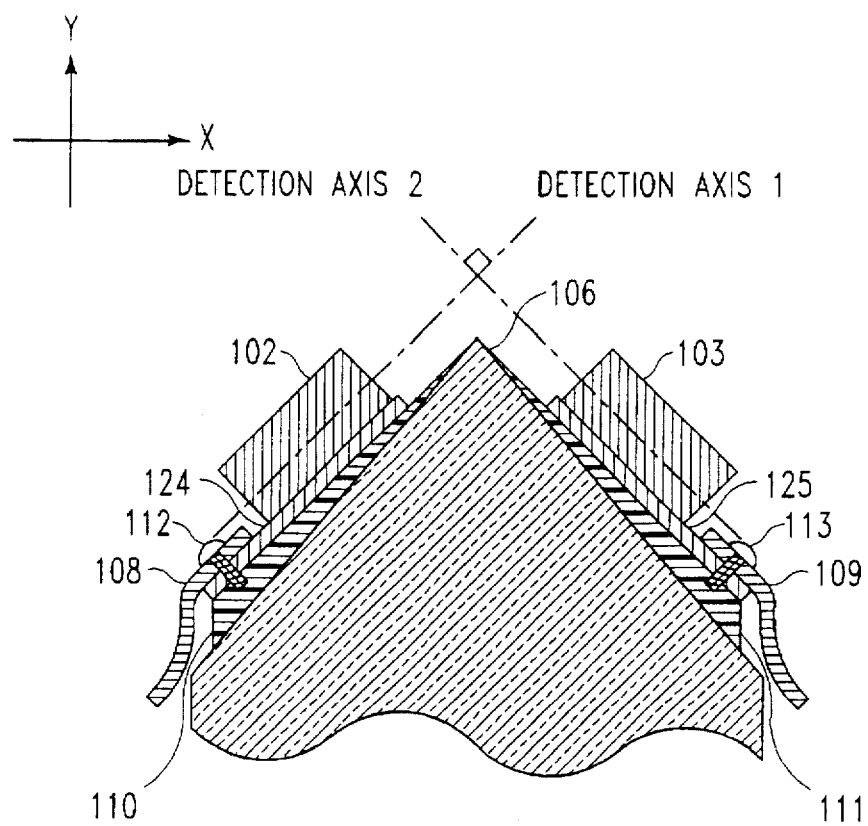
FIGS. 3(a) and 3(b) show mounting of the camera shake detecting device of the first embodiment of the present invention.
Figure 3B:
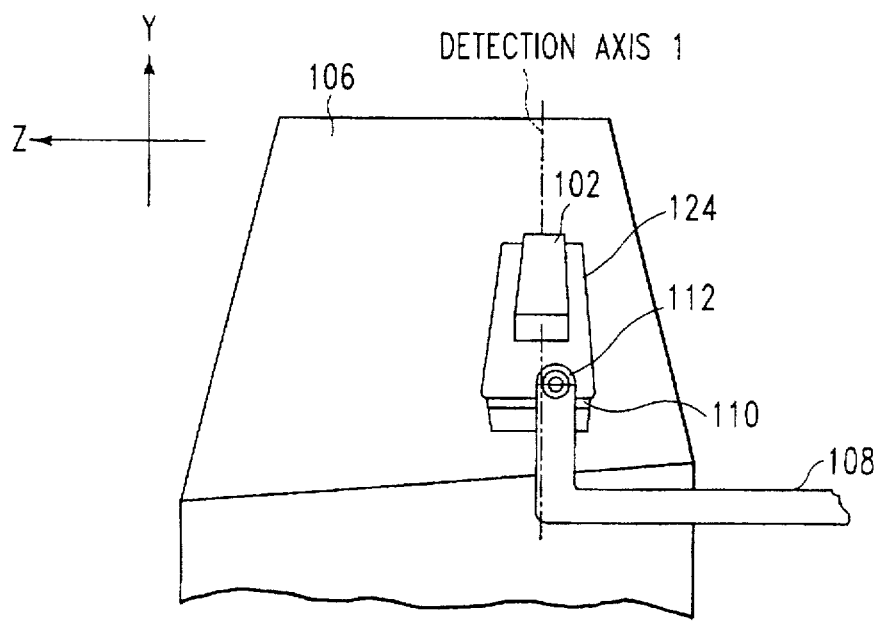

FIGS. 3(a) and 3(b) concretely show the vibration-type gyros 102 and 103, supporting members for supporting the gyros, and the connection relationship thereof. FIG. 3(a) is a sectional view of the pentagonal prism 106 and the two vibration-type gyros 102 and 103 viewed from the eyepiece side, and FIG. 3(b) shows a perspective view of a part of the pentagonal prism viewed from above.

The two vibration-type gyros 102 and 103 are mounted to be in a "mirror image relationship" with respect to the y-axis. That is, the gyros are arranged to be symmetrical with respect to the vertical line extending through the vertex of the pentagonal prism 106. Accordingly, of the two vibration-type gyros 102 and 103 in FIG. 3(a), the vibration-type gyro 102 only will be described. The vibration-type gyro 102 is mounted on a rigid substrate 124 in parallel with its longitudinal axis. The rigid substrate 124 is further fixed to an inclined plane supporting member 110 made of, for example, plastic, so that the detection axis 1 of the vibration-type gyro 102 forms an angle of 45° with respect to the x-axis.

Further, a flexible substrate 108 is coupled by a connector 112 to the rigid substrate 124, is electrically connected to an external control portion (not shown) via signal lines (not shown) and is supplied with power via a power Line (not shown).

The rigid substrate 124 integrally secures the vibration-type gyro 102 mounted thereon, via the inclined plane supporting member 110, to the pentagonal prism 106 secured to the camera body, and directly transmits the movement of the camera body to the vibration type gyro 102. That is, the shake of the camera body is surely transmitted to the vibration-type gyro 102 by mounting it on the rigid substrate 124.

In the above-described example, the inclined plane supporting member 110 is formed by a member other than the pentagonal prism 106. However, if the pentagonal prism is secured by a cover (not shown), or if a so called "pentagonal mirror" is employed with its inside hollow and its reflecting surfaces formed by mirror surfaces, the inclined plane supporting member may be formed as one pieced of plastic member to further reduce the number of parts.

The reason why the vibration-type gyros as the shake detecting sensors are arranged on the paccogonal prism in accordance with the present invention will be described. The space in which the pentagonal prism of the camera is located is covered by the housing of the camera body, and the pentagonal prism does not necessarily contact the housing. Thus, providing a certain gap therebetween does not result in enlarging the camera body. Therefore, this gap is utilized to arrange the shake detecting device in accordance with the present invention.

In accordance with the first embodiment of the present invention, since the shake signal processing IC 150, which is apt to be influenced by electric noise from the surroundings, is arranged in the vicinity of the vibration-type gyros, the IC 150 can be separated from the motor and the battery which are the main sources of noise, so that it will seldom be affected by the disturbance noise. Moreover, since the vibration-type gyros are arranged on the pentagonal prism 106, it is not necessary to provide a new space in the central part of the camera which is structurally complicated and spatially small, so that it is not necessary to make the size of the camera body larger than that of a conventional one.

Thus, since no otherwise useless space is required to be newly provided, the provision of the camera shake detecting device of this invention is not a direct factor to make the camera body and interchangeable lenses larger, and therefore it cannot be an obstacle to miniaturizing and lightening the camera. Accordingly, the camera shake detecting device can be arranged efficiently in a relatively limited space in the camera, so that it is easy to provide a camera with a compact external form.

Figure 4:
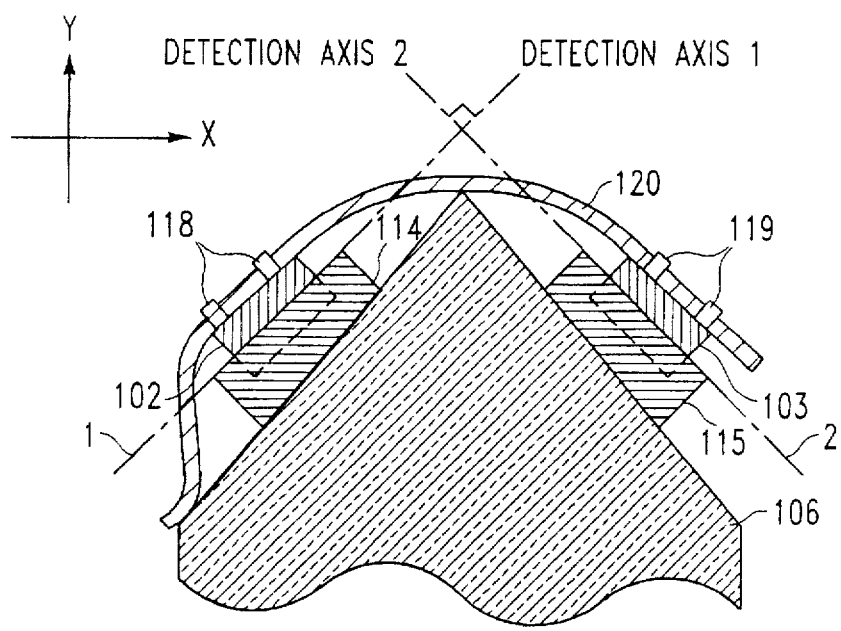
FIG. 4 is a sectional view of a pentagonal prism and supporting members for supporting vibration-type gyros, illustrating mounting of a camera shake detecting device of a second embodiment of the present invention.

FIG. 4 shows a second embodiment of the camera shake detecting device in accordance with the present invention. Also in this embodiment, two vibration-type gyros 102 and 103 are arranged in the same way as shown in FIG. 3(a). That is, the two vibration-type gyros 102 and 103 are set symmetrically with respect to the vertical line (the y-axis) passing through the vertex of a pentagonal prism 106. Accordingly, their mounting will be described below, focusing on one vibration-type gyro 103.

In this embodiment, the two vibration-type gyros 102 and 103 are coupled to a single flexible substrate 120. At two positions on the upper surface of the vibration-type gyro 103, terminals 119 are provided as shown in FIG. 4, and these terminals are electrically connected to predetermined lines (not shown) in the flexible substrate 120. Further, the flexible substrate 120 is connected not only to the terminals 119 of the vibration-type gyro 103, but also to a plurality of terminals 118 provided on the other vibration-type gyro 102. Further, it is also connected to a shake signal processing integrated circuit (not shown). One end of the flexible substrate 120 is also electrically connected to an external control portion (not shown) via signal lines(not shown) and is supplied with power via a power line (not shown).

Furthermore, as shown in FIG. 4, inclined plane supporting members 114 and 115 as supporting members of the vibration-type gyros 102 and 103 are fixed on the pentagonal prism 106 symmetrically with respect to the vertical line (the y-axis) passing through the vertex of the pentagonal prism 106. The inclined plane supporting member 115 has a recess (shown with phanton lines) of a size to fit about a half of the vibration-type gyro 103 therein, so that the gyro 103 can be fixed in the recess. The vibration-type gyro 103 coupled to the flexible substrate 120 is fitted in the recess of the inclined plane supporting member 115 such that the surface of the gyro 103 opposite to its surface coupled to the flexible substrate 120 is directed downward, until the downward directed surface reaches the base of the recess.

Like the above-described first embodiment, also in this structure, the respective detection axes 1 and 2 of the two vibration-type gyros 102 and 103 are perpendicular to each other and are positioned at an angle of 45° with respect to the x and y axes along the two sides of the film plane (not shown).

Thus, in the second embodiment, the supporting members 114 and 115 of a fitting type and the flexible substrate 120 are employed. The single flexible substrate 120 commonly coupled to the two vibration-type gyros 102 and 103 is arranged so as to detour the uppermost part of the pentagonal prism 106. Normally, the flexible substrate 120 is easy to shield against electrical noise from the surroundings. By taking the detour as in the example, the flexible substrate 120 is positioned farthest from the motor and the battery which are main sources of noise, so that the flexible substrate 120 will be less affected by the disturbance noise.

Further, by employing the single coupling member to couple the respective vibration-type gyros, the number of parts and the time for mounting them is reduced. Moreover, by using the supporting members 114 and 115 of a fitting type, their fixing work is also reduced.

In addition, various modifications can be made without departing from the scope of the present invention. For example, the supporting members for fixing the two vibration-type gyros 102 and 103 on the pentagonal prism 106 may be of other form than the above-described one, provided that the supporting members can fix the vibration-type gyros integrally to the camera body. Furthermore, in the shake reduction method for making exposure when the shake is smaller, it is only required that the two detection axes of the vibration-type gyros intersect. The intersection angle is preferably 90°, but it may be another value approximate to 90°. Depending on the value, the above-described angle θ changes.

Further, although the examples described here relate to a single lens reflex camera, the gist of the present invention concerning the degree of freedom of arrangement is also applicable to other cameras having no pentagonal prism.

As described above, the camera shake detecting device of the present invention comprises a first shake detector for detecting an amount of a camera shake in a first direction which is not parallel to the long side and the short side of the image plane, and a second shake detector for detecting an amount of a camera shake in a second direction which is perpendicular to the first direction. Therefore, as compared with the example in which the directions of the detection axes of the shake detectors are coincident with the directions of the sides of the film frame, the degree of freedom of arrangement is large. Since the shake detectors can be arranged easily in a space such as on the inclined part of the pentagonal prism 106, a small otherwise vacant space in the camera body can be utilized and the camera body does not become larger. Moreover, the present invention can provide a small-sized camera having a camera shake detecting function, which will hardly be influenced by the disturbance noise generated from a power source or a motor in the camera itself.

Figure 5:
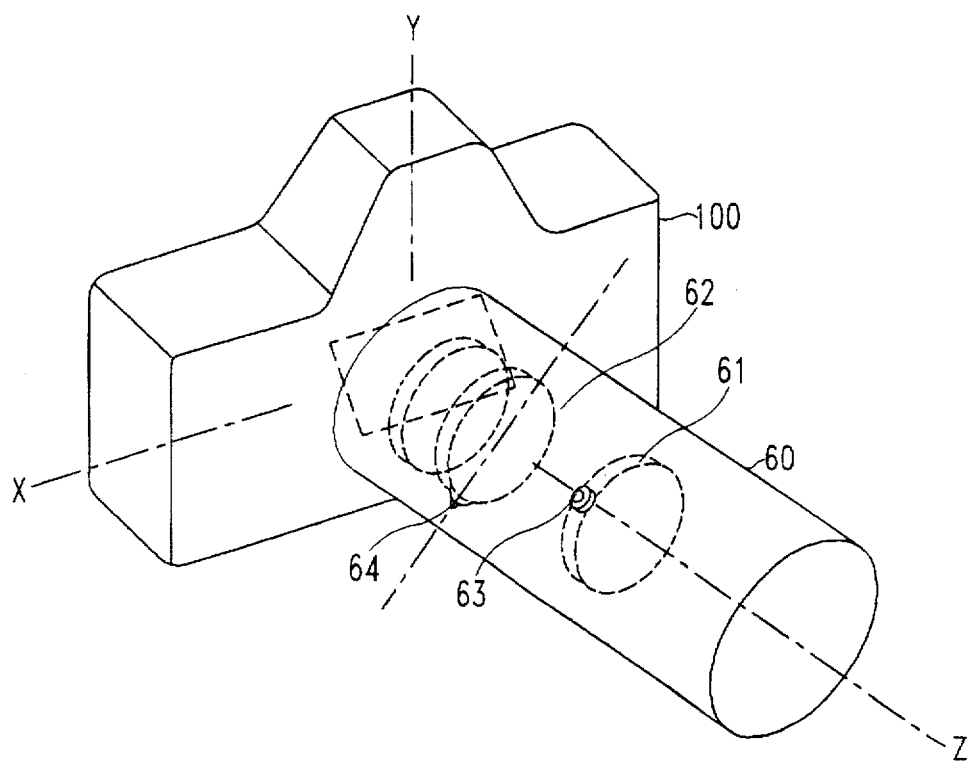
FIG. 5 is a perspective view of a camera shake preventing device to which the present invention is applied.
Figure 6A:
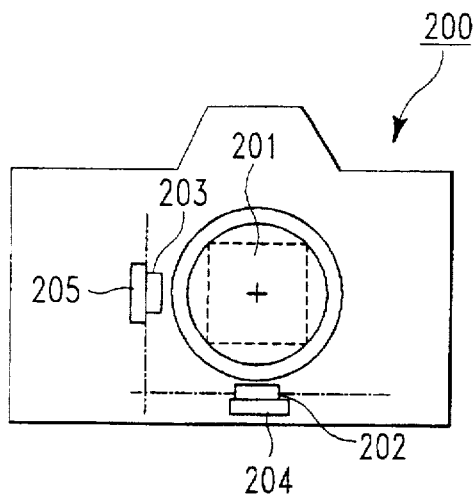
FIGS. 6(a), 6(b), 6(c) and 6(d) show a conventional camera.
Figure 6B:
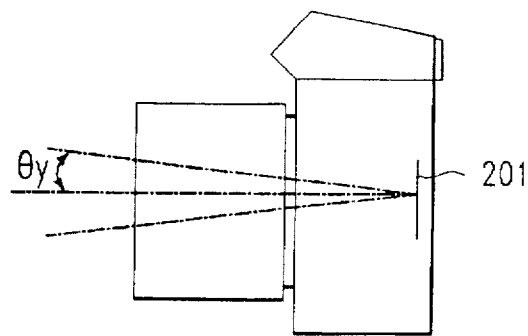
Figure 6C:
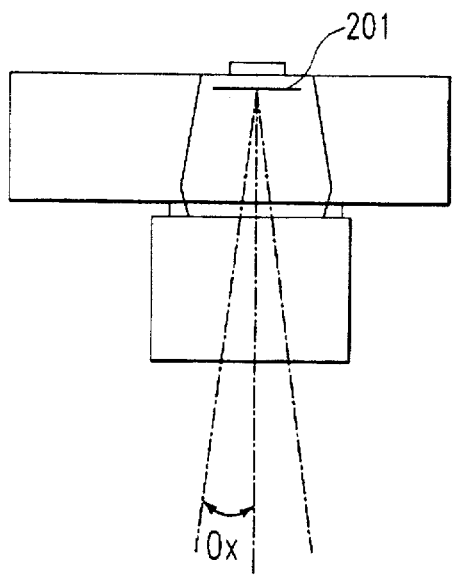
Figure 6D:
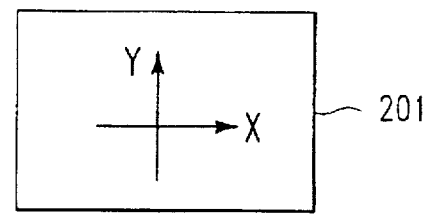

Next, referring to FIG. 5, a camera shake preventing device using the present invention will be described. The camera shake preventing device is used to prevent the influence of the shake by driving a correcting optical system to cancel the shake of an object image occurring at least during exposure.

In a lens barrel 60 mounted on a camera body 100, a plurality of lens groups for imaging the object to be photographed are provided, and shake correcting lenses 61 and 62 are also arranged for correcting the change, caused by the shake, of the angle of light incident on the photographing lens. The lenses 61 and 62 are rotatably held by rotating members 63 and 64, respectively, at an angle of 45° with respect to the x-and y-axes. The directions of the rotation axes of the rotating members are respectively coincident with the directions of the detection axes 1 and 2 of the angular velocity detecting gyros 102 and 103 shown in FIG. 1. The shake correcting lenses 61 and 62 are driven by actuators (not shown), and the amount of the drive is determined based on the outputs of the angular velocity detecting gyros 102 and 103. Thus, since the influence of the camera shake on the light from the object to be photographed is corrected by the two shake correcting lenses 61 and 62, a still image of the object is formed on the film plane.

In this embodiment, the directions of the rotation axes of the shake correcting lenses 61 and 62 are coincident with those of the detection axes of the angular velocity detecting gyros 102 and 103 in order to easily calculate the amount of drive of the shake correcting lenses, but they are not necessarily coincident. However, in this case, it is required that the outputs of the two angular velocity detecting gyros be synthesized by calculation to get the amount of drive of the shake correcting lenses. Further, the correcting lenses 61 and 62 are supposed to be driven only during exposure, but without being limited to this, it is also possible to operate the shake preventing device while an image of an object to be photographed is observed via the finder. In this case, a still image of the object can be observed.

Furthermore, in the present embodiment, an example is described in which the influence of the camera shake is canceled by driving the shake correcting lenses. However, it is natural that the camera shake detecting device of the present invention can be applied to a so-called simple vibration preventing device in which the film is exposed when the amount of the camera shake is at a minimum or when the amount becomes smaller than a predetermined value.

Moreover, the camera in the respective embodiments of the present invention is of the type using a silver film. However, it is natural that the present invention can be applied to an electronic still camera utilizing an image pick-up device of a CCD or MOS type.

Thus, the present invention can provide a camera shake detecting device in which the degree of freedom of its arrangement in the camera is large and the camera body does not become larger.

What is claimed is:

1. A camera shake detecting device for a camera having a pentagonal prism and including an image plane having a long side and a short side, the device comprising:

a first shake detector having a first detection axis which is different from directions of the long side and the short side of the image plane, the first shake detector detecting an angular velocity around the first detection axis; and a second shake detector having a second detection axis which is perpendicular to the first detection axis, the second shake detector detecting an angular velocity around the second detection axis, wherein the first detection axis and the second detection axis are positioned on a plane which is perpendicular to an optical axis, and arranged symmetrically with respect to a straight line including the optical axis and a vertex of the pentagonal prism when viewed from the direction of the optical axis.

2. The camera shake detecting device according to claim 1, wherein said first and second shake detectors are arranged on said pentagonal prism.

3. The camera shake detecting device according to claim 2, wherein said pentagonal prism has a pair of roof planes, and said first and second shake detectors are arranged on the pair of roof planes, respectively.

4. The camera shake detecting device according to claim 1, wherein said first and second shake detectors each generate a signal, and the camera shake detecting device further includes a signal processing circuit for processing signals, said signal processing circuit being arranged on a pair of roof planes of said pentagonal prism.

5. The camera shake detecting device according to claim 1, further comprising first supporting means for supporting said first shake detector and securing it to said camera, and second supporting means for supporting said second shake detector and securing it to said camera, wherein the first and second supporting means are supported on the pentagonal prism such that the first and second detection axes intersect at a predetermined angle.

6. The camera shake detecting device according to claim 1, wherein said detecting element is an angular velocity detecting element of a piezo-electric vibration type.

7. The camera shake detecting device according to claim 1, wherein both said first and second shake detectors are coupled with a single flexible substrate extending from one side to another side of roof planes of the pentagonal prism via the vertex of the prism.

\* \* \* \* \*